United States Patent
Akduman

(10) Patent No.: US 12,466,546 B2
(45) Date of Patent: Nov. 11, 2025

(54) CONTROL MECHANISM FOR AN AIR VEHICLE

(71) Applicant: TUSAS—TURK HAVACILIK VE UZAY SANAYII ANONIM SIRKETI, Kahramankazan (TR)

(72) Inventor: Serhat Akduman, Kahramankazan (TR)

(73) Assignee: TUSAS—TURK HAVACILIK VE UZAY SANAYII ANONIM SIRKETI, Kahramankazan/Ankara (TR)

(*) Notice: Subject to any disclaimer, the term of this patent is extended or adjusted under 35 U.S.C. 154(b) by 0 days.

(21) Appl. No.: 18/570,230

(22) PCT Filed: Jun. 21, 2022

(86) PCT No.: PCT/TR2022/050623
§ 371 (c)(1),
(2) Date: Dec. 14, 2023

(87) PCT Pub. No.: WO2023/277847
PCT Pub. Date: Jan. 5, 2023

(65) Prior Publication Data
US 2024/0281018 A1 Aug. 22, 2024

(30) Foreign Application Priority Data
Jun. 29, 2021 (TR) ................ 2021/010608

(51) Int. Cl.
G05G 9/047 (2006.01)
B64C 13/04 (2006.01)
(Continued)

(52) U.S. Cl.
CPC .......... *B64C 13/0421* (2018.01); *B64C 13/06* (2013.01); *G05G 9/047* (2013.01); *B64C 27/00* (2013.01); *G05G 2009/04703* (2013.01)

(58) Field of Classification Search
CPC ..... B64C 13/0421; B64C 13/06; B64C 27/00; G05G 2009/047003; G05G 2505/00; G05G 5/005; G05G 5/047
See application file for complete search history.

(56) References Cited

U.S. PATENT DOCUMENTS

| | | |
|---|---|---|
| 2,206,474 A | 7/1940 | Bowers et al. |
| 3,332,643 A | 7/1967 | Toner |

(Continued)

FOREIGN PATENT DOCUMENTS

| | | | |
|---|---|---|---|
| FR | 2449924 A1 | * | 9/1980 |
| GB | 1353564 A | | 5/1974 |
| GB | 1506618 A | | 4/1978 |

OTHER PUBLICATIONS

International Search Report and Written Opinion for PCT application No. PCT/TR2022/050623, mailed Sep. 23, 2022.
(Continued)

*Primary Examiner* — Minnah L Seoh
*Assistant Examiner* — Gregory T Prather
(74) *Attorney, Agent, or Firm* — Notaro, Michalos & Zaccaria P.C.

(57) ABSTRACT

A control mechanism for a console (C) provided in in an air vehicles has at least one control stick (2) located on the console (C) that provides mission input to the air vehicle by a user and at least one bracket (3) that allows the control stick (2) to be attached on the console (C).

9 Claims, 4 Drawing Sheets

(51) Int. Cl.
*B64C 13/06* (2006.01)
*B64C 27/00* (2006.01)

(56) References Cited

U.S. PATENT DOCUMENTS

| | | | |
|---|---|---|---|
| 3,839,923 A | 10/1974 | Dean | |
| 6,347,770 B1* | 2/2002 | Oyzerskiy | B64C 13/0421 |
| | | | 244/221 |
| 2007/0137404 A1* | 6/2007 | Bertani | G05G 5/005 |
| | | | 74/523 |
| 2008/0180272 A1* | 7/2008 | Scherer | A63H 30/04 |
| | | | 340/13.24 |
| 2009/0230279 A1* | 9/2009 | Stango | G05G 5/005 |
| | | | 361/825 |
| 2011/0025108 A1* | 2/2011 | Wihinen | B60N 2/797 |
| | | | 74/471 XY |
| 2015/0134149 A1* | 5/2015 | De Mers | F16H 61/0202 |
| | | | 701/3 |
| 2019/0263504 A1* | 8/2019 | Lavallee | B64C 13/0421 |
| 2022/0410713 A1* | 12/2022 | Klaiber | B60K 35/10 |
| 2024/0140592 A1* | 5/2024 | Yerant | B64C 13/14 |

OTHER PUBLICATIONS

International Preliminary Report on Patentability, completed on Apr. 5, 2023.
Demand/Request for Preliminary Examination dated Mar. 21, 2023.
International Application Status Report—generated Dec. 4, 2023.

* cited by examiner

CONTROL MECHANISM FOR AN AIR VEHICLE

FIELD

The present invention relates to control mechanisms located in air vehicles.

BACKGROUND

Mission equipment is located internally or externally on the console for use in air vehicles. It is provided with an interconnector mechanism so that external control units can be mounted on the console.

The assemblies of the external manual control unit mission equipment used in air and/or space vehicles are fixed on the console in a removable way. In cases where the equipment is assembled in a fixed manner, there is a risk of creating visual and/or physical obstacles to other equipment on the cockpit center console.

U.S. Pat. No. 4,421,287, which is included in the known-state of the art, comprises a helicopter control unit with a display. The manual control unit of helicopter comprises a restraint member to provide the pilot with the feel that he/she is inadvertently moving control unit from its mid-position when the helicopter is on the ground, which may be pivoted from its stowed position into an operable position to change from a safe to an unsafe position for ground personnel. The restraint member comprises an over-center spring, and in use, rests in the mid-position. It is disclosed that if the pilot inadvertently tries to move the control unit forward or laterally from the mid-position, the over-center spring creates resistance against this movement.

Another patent document no. U.S. Pat. No. 3,332,643A discloses a control system for aircraft. Said control system comprises a cyclic handle and a collective handle in order to receive user control inputs.

Another patent document no. U.S. Pat. No. 2,206,474A discloses an airplane control column. Said control column comprises a grip member, a base member, and a cutaway member provided with slots, said base member being movably mounted in said slots.

Another patent document no. GB1506618A discloses a retractable collective pitch control stick for a helicopter. Said stick has telescopic shape and comprises a first portion; a second portion capable of sliding over said first portion; and means for maintaining said portions in a pitch stick maximum length relationship and permitting a minimum length relationship.

Another patent document no. U.S. Pat. No. 3,839,923A discloses a reversible yaw control system for a helicopter. Said system comprises a sensing means responsive to engine torque and to the position of the collective pitch control stick for operating a reversing device disposed between a foot pedal operated input link and a differential collective pitch control output link.

Another patent document no. GB 1353564A discloses a pitch control device for helicopters. Said control device comprising control sticks, which are pivotally connected to a torque tube by means of pins; and control sticks, which are connected with each other by a horizontal rod member.

SUMMARY

Thanks to a control mechanism according to the present invention, position of the external equipment on the console can be changed by means of an interconnector mechanism after they are used in flight or when they are not required to be used during the flight. Thus, visual and/or physical accessibility of the equipment to the internal equipment and/or other external equipment in the area is ensured.

Another object of the present invention is to provide a generic solution for external mission equipment for use in the consoles of air vehicles by means of the interconnector in the control assembly.

A further object of the present invention is to provide the user with easy access to the internal mission equipment by means of the control mechanism Yet another object of the present invention is to enable the external mission equipment requested by the user to be mounted on the console in a removable way and to change position thereof by means of the control mechanism.

Still a further object of the present invention is to provide a control mechanism that has a simple, easy to use, practical and effective joint connecting piece.

The control mechanism realized to achieve the object of the present invention, which is defined in the first claim and the other claims dependent thereon, comprises at least one console provided in air vehicles, which has various mission inputs. It comprises at least one control stick which is located on consoles of air vehicles internally and/or externally, enables a user to input various missions, and moved by a hand of the user. The control stick is attached to the console by means of at least one bracket.

The control mechanism of the invention comprises a first position (I) in which the control stick extends outward from the console to approach the pilot, and a second position (II) in which the control stick extends downward from the console away from the pilot. The connecting piece, which is connected to the control stick at one end and to the bracket at the other end, comprises attaching the control stick to the bracket. It comprises at least one connection point on the bracket that allows attachment of the bracket. It comprises at least one channel located on the bracket, which is spaced from the connection point. When the connecting piece slides through the channel with the end thereof contacting the bracket, the control stick moves between the first position and/or the second position (II).

In an embodiment of the invention, the first piece has a cylindrical form, wherein the first piece extends from the part of the connecting piece that connects to the control stick. The second piece, which has a design that extends from the first part by thickening in an eccentric form, is in contact with the bracket of the connecting piece.

In an embodiment of the invention, the control mechanism comprises at least one connecting rod located on the bracket so as to extend outward from the bracket. It comprises two connecting rods which extend parallel from the bracket. Movement of the connecting piece is restrained between these two connecting rods. The connecting rods are attached to the bracket in a removable manner.

In an embodiment of the invention, the control mechanism comprises attaching the connecting piece at the connection point located between the connecting rods. The connection point acts as a center of rotation for the control stick. It comprises at least one connecting pin so that the connecting piece can be connected to the bracket at the connection point.

In an embodiment of the invention, the control mechanism comprises at least one handle extending outwardly from the connecting piece to enable movement of the second piece on the channel for movement of the connecting piece.

In an embodiment of the invention, the control mechanism comprises two spring pin holes located on the channel to enable that the handle attached to the connecting piece is fixed in the first position (I) or second position (II). Thanks to the spring pin hole, the connecting piece can be fixed in the first position (I) or the second position (II).

In an embodiment of the invention, the control mechanism comprises at least one spring pin located in connection with the handle, which, by pulling or compressing, stores energy inside, thereby securing the connecting piece in the spring pin hole.

In an embodiment of the invention, the control mechanism comprises the connecting piece produced in V-form. The first piece and the second piece move in opposite directions. The connecting piece, the first piece and the control stick are enabled to move simultaneously on the same axis.

In an embodiment of the invention, the control mechanism comprises a floor on which the console is located. It comprises the first position (I) in which the control stick moves away from the floor over the console, the second position (II) in which the control stick extends out of the console towards the floor.

In an embodiment of the invention, the control mechanism comprises a rail mechanism removably attached to the console. The rail mechanism, on which the bracket is attached, can be brought closer to or further away from the user according to the user's demand.

The control mechanism comprises a third position (III) in which the control stick is closer to the user on the rail mechanism, and a fourth position (IV) in which the control stick is slid from the third position to move away from the user.

In an embodiment of the invention, the control mechanism comprises a control unit to which mission inputs are transferred. The mission input provided to the control stick by the user is transferred to the control unit via the cables passing through the first hollow piece.

In an embodiment of the invention, the control mechanism comprises the control stick used for electro-optical sensor equipment.

In an embodiment of the invention, the control mechanism comprises using the control stick on the console especially for helicopters among air vehicles.

In an embodiment of the invention, the control mechanism comprises the control stick which can be attached to the console after the air vehicle is produced. It comprises the control stick removably attached to console via bracket for external mission input to air vehicle. Since the control stick is removably attached on the console, external missions can be input to the air vehicle.

BRIEF DESCRIPTION OF THE DRAWINGS

The control mechanism realized to achieve the object of the present invention is illustrated in the attached drawings, in which.

Figure 1:
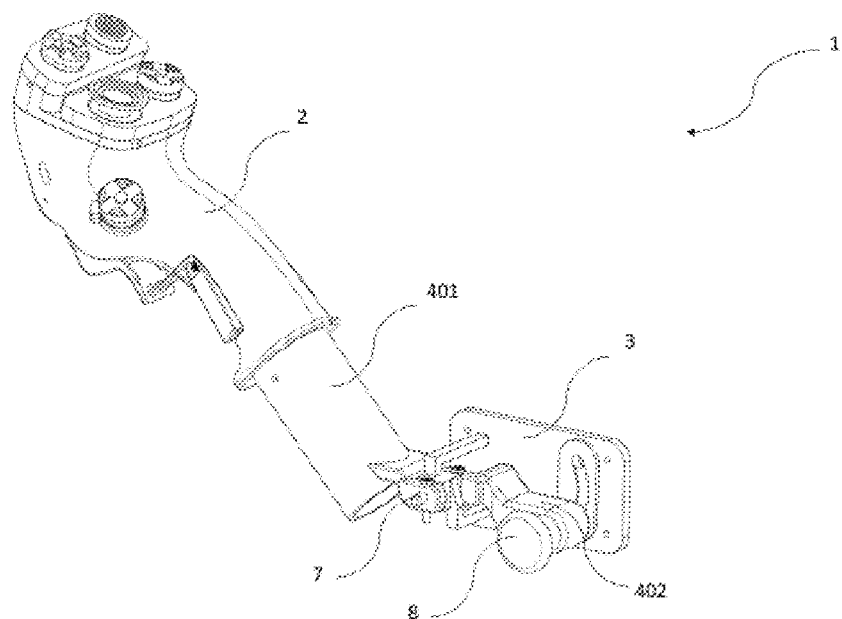
FIG. 1—is a perspective view of the control mechanism.

All the parts illustrated in figures are individually assigned a reference numeral and the corresponding terms of these numbers are listed below:

1. Control Mechanism
2. Control Stick
3. Bracket
4. Connecting Piece
401. First Piece
402. Second Piece
5. Connection Point
501. Connecting Rod
6. Channel
601. Spring Pin Hole
7. Connecting pin
8. Handle
9. Spring Pin
10. Rail Mechanism
(C) Console
(K) Control Unit
(Z) Floor
(I) First Position
(II) Second Position
(III) Third Position
(IV) Fourth Position

DETAILED DESCRIPTION

The control mechanism (1) comprises a console (C) provided in air vehicles; at least one control stick (2) located on the console (C), providing mission input to the air vehicle by the user; at least one bracket (3) allowing the control stick (2) to be attached on the console (C).

Figure 5:
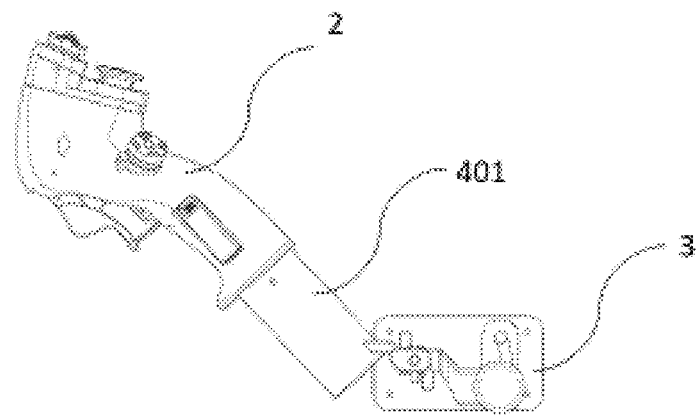
FIG. 5—is a perspective view of the connecting rod in the first position (I).
Figure 6:
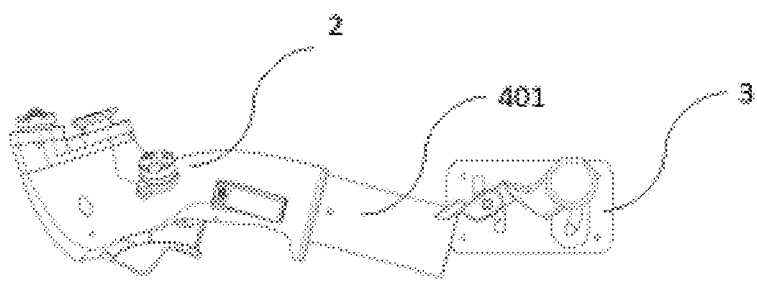
FIG. 6—is a perspective view of the connecting rod in the second position (II).

The control mechanism (1) of the invention comprises a first position (I) in which the control stick (2) extends outward from the console (C); a second position (II), wherein the control stick (2) is rotated from the first position (I) so as to be brought into the second position (II); at least one connecting piece (4) connecting the control stick (2) and the bracket (3), with one end connected to the control stick (2) and one end to the bracket (3); at least one connection point (5) which is a center of rotation for the control stick (2), is located on the bracket (3) and allows the connecting piece (4) to be attached to the bracket (3); at least one channel (6) located on the bracket (3) such that a distance is at least partially provided between the channel (6) and the connection point (5), wherein the channel (6) allows the control stick (2) to rotate to be brought to the first position (I) and/or second position (II); the control stick (2) which is moved by sliding the end of the connecting piece (4) contacting the channel (6) within the channel (6), so that the control stick (2) is brought into the first position (I) and/or second position (II) (FIG. 1, FIG. 5, FIG. 6).

At least one console (C) provided in air vehicles and at least one control stick (2) located on the console (C) provide task input to the air vehicle by the user. Thanks to at least one bracket (3) located on the console (C), the control stick (2) can be attached on the console (C).

Thanks to the first position (I) in which the control stick (2) on the console (C) extends outward from the console (C), and to the second position (II) into which the control stick (2) is rotated, the control stick (2) is enabled to change position. Since one end of the connecting piece (4) is connected to the control stick (2) and one end to the bracket (3), the control stick (2) can be attached to the bracket (3). Thanks to the connection point (5) on the bracket (3), the connecting piece (4) is attached to the bracket (3). The connection point (5) provides a center of rotation for the control stick (2). Thanks to at least one channel (6) located on the bracket (3) such that a distance is at least partially provided between the channel (6) and the connection point (5), the control stick (2) is enabled to rotate so as to be brought into the first position (I) and/or the second position (II). As the end of the connecting piece (4) contacting the channel (6) slides within the channel (6), the control stick (2) can be brought into the first position (I) and/or the second position (II).

In an embodiment of the invention, the control mechanism (1) comprises a first piece (401) having a cylindrical form, which connects the connecting piece (4) to the control stick (2); a second piece (402) located on the connecting piece (4) to be integral with the first piece (401), extending eccentrically from the first piece (401) with an inclined and thickened manner, and contacting the bracket (3) on the connecting piece (4). Thanks to the first piece (401) which is the cylindrical end of the connecting piece (4) connected to the control stick (2), and to the second piece (402) extending from the first piece (401) towards the bracket (3), thickening in an eccentric form, the control stick (2) can be attached to the bracket (3).

In an embodiment of the invention, the control mechanism (1) comprises at least one connecting rod (501) extending outward from the bracket (3), which limits the movement of the connecting piece (4) and allows the connecting piece (4) to be removably attached to the bracket (3). Since the connecting rod extends outward from the bracket (3), contacts the connecting piece (4) and limits the movement of the connecting piece (4), the connecting piece (4) can be removably attached to the bracket (3).

In an embodiment of the invention, the control mechanism (1) comprises at least one connecting pin (7), which is a center of rotation for the movement of the control stick (2) and connects the connecting piece (4) and the connecting rod (501) at the connection point (5) via apertures (403). Thanks to the connecting pin (7), the connecting piece (4) can be connected through the connection point (5) that couples the parallel connecting rods (501).

In an embodiment of the invention, the control mechanism (1) comprises at least one handle (8) which extends outward from the connecting piece (4) via aperture 404 and allows the connecting piece (4) to slide on the channel (6). Thanks to the handle (8), position of the control stick (2) can be changed by the user.

In an embodiment of the invention, the control mechanism (1) comprises at least two spring pin holes (601) located on the channel (6), which allow the connecting piece (4) to be fixed on the first position (I) or the second position (II). Thanks to at least two spring pin holes (601) located as recesses on the channel (6), the connecting piece (4) can be fixed in the first position (I) and/or the second position (II).

Figure 2:
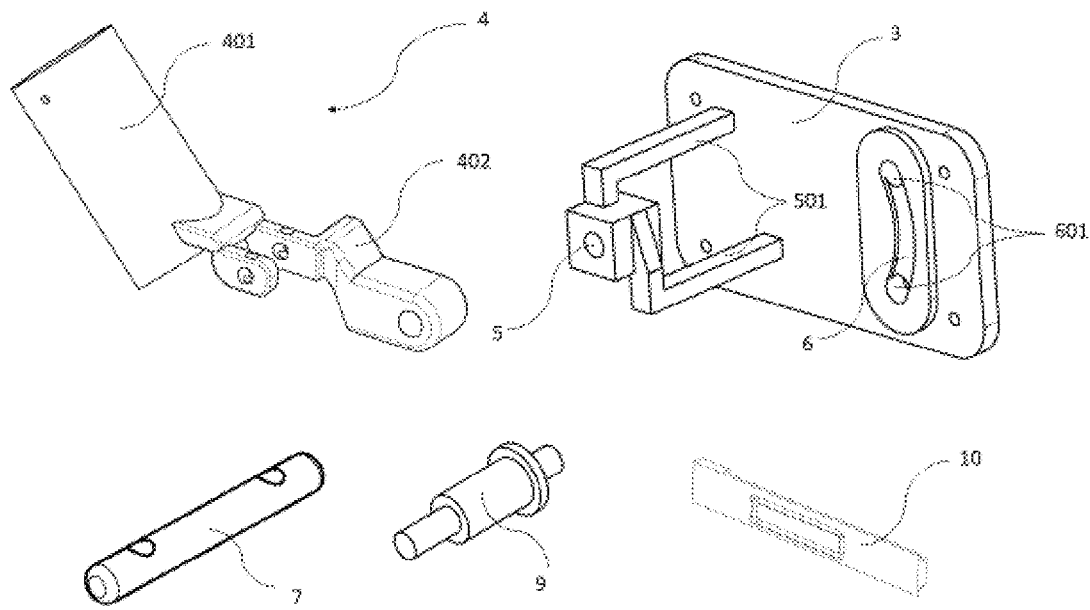
FIG. 2—is an exploded view of the control mechanism.
Figure 3:
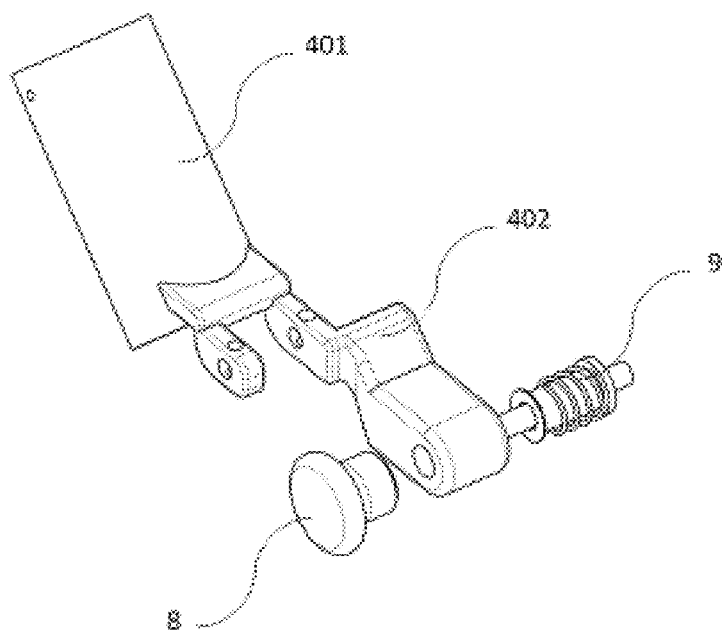
FIG. 3—is an exploded view of the connecting piece.

In an embodiment of the invention, the control mechanism (1) comprises at least one spring pin (9) located in connection with the handle (8), which enables the connecting piece (4) to be fixed in the spring pin hole (601) by pulling or compressing. Thanks to the spring pin (9) that stores energy thereon, the connecting piece (4) is enabled to be fixed in any of the spring pin holes (601) when it is pulled and/or compressed (FIG. 2, FIG. 3).

In an embodiment of the invention, the control mechanism (1) comprises the V-shaped connecting piece (4). Thanks to the V-shaped connecting piece (4), the first piece (401) and the second piece (402) can move in opposite directions.

Figure 4:
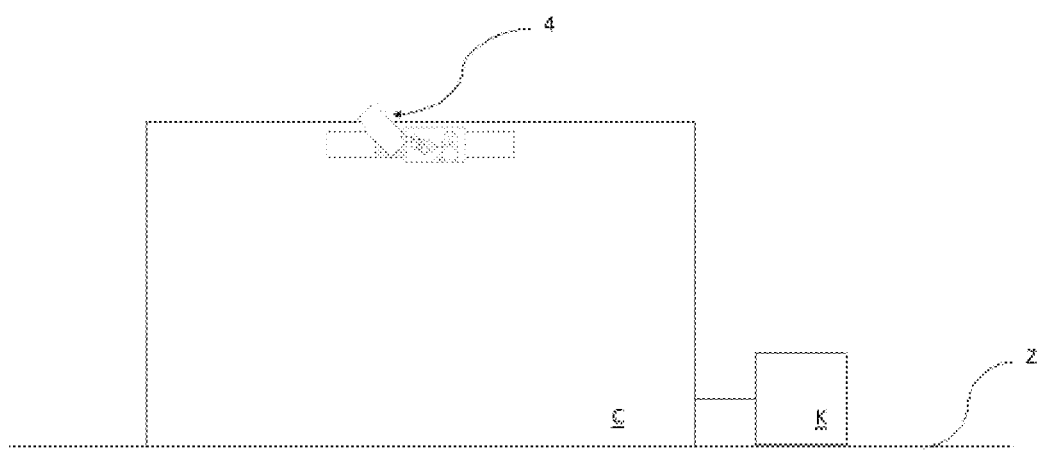
FIG. 4—is a schematic view of the console and control unit.

In an embodiment of the invention, the control mechanism (1) comprises at least one floor (Z) on which the console (C) is located; the first position (I) in which the control stick (2) extends upward from the console (C) relative to the floor (Z); the second position (II) in which the control stick (2) extends downward from the console (C) relative to the floor (Z). thanks to the first position (I) extending outward from the console (C), closer to the user, relative to the floor (Z) and the second position (II) extending downward from the console (C), away from the user, relative to the floor (Z), the control stick (2) can be moved according to the user preferences (FIG. 4).

Figure 7:
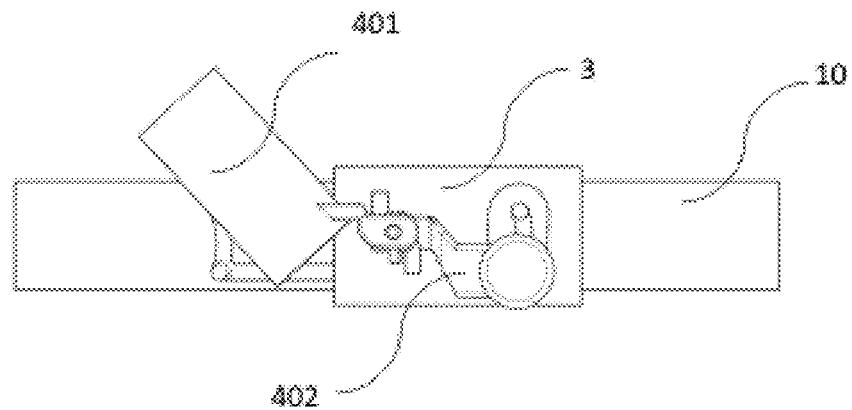
FIG. 7—is a front view of the connecting rod in the third position (III).
Figure 8:
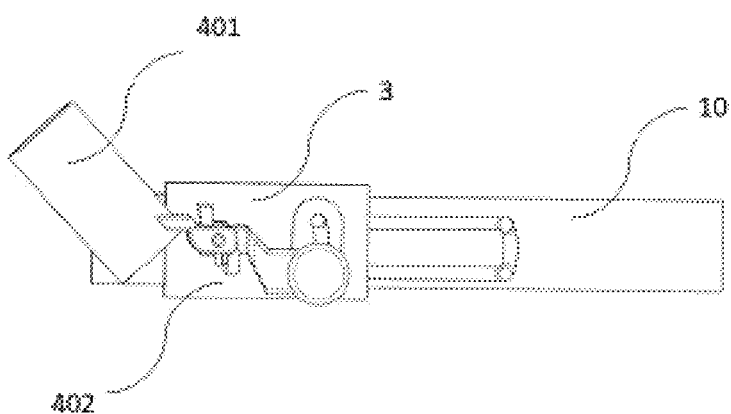
FIG. 8—is a front view of the connecting rod in the fourth position (IV).

In an embodiment of the invention, the control mechanism (1) comprises at least one rail mechanism (10) on which the bracket (3) is attached, which is located on the console (C) in a removable manner and allows the bracket (3) to move by sliding; a third position (III) in which the control stick (2) is fixed on the rail mechanism (10) closer to the user; a fourth position (IV) in which the control stick (2) moves away from the user by sliding the bracket (3) from the third position (III). Thanks to the rail mechanism (10), the control stick (2) is also able to move on the horizontal axis (FIG. 7, FIG. 8).

In an embodiment of the invention, the control mechanism (1) comprises at least one control unit (K) to which data is transferred via cables extending from the first piece (401), for the mission input provided to the control stick (2) by the user. It enables the mission inputs to be transmitted from the control stick (2) to the control unit (K) via cables.

In an embodiment of the invention, the control mechanism (1) comprises the control stick (2), which is an electro-optical sensor equipment.

In an embodiment of the invention, the control mechanism (1) comprises the control stick (2) used for the console (C) provided on the helicopter.

In an embodiment of the invention, the control mechanism (1) comprises the bracket (3) which can be attached to the console (C) after the air vehicle is produced, wherein the bracket (3) allows the control stick (2), which is used for external mission input that can consist of different mission equipment, to be attached on the console (C). Thanks to the bracket (3), external use of different mission equipment can be provided.

The invention claimed is:

1. A control mechanism (1) comprising:
    a console (C) for an air vehicle;
    at least one control stick (2) for providing mission input to the air vehicle by a user, the control stick (2) having a first position (I) in which the control stick (2) extends outward from the console (C), and a second position (II), wherein the control stick (2) is rotated from the first position (I) so as to be brought into the second position (II);
    a bracket (3) for attaching the control stick (2) to the console (C);
    a connecting piece (4) connecting the control stick (2) to the bracket (3), with a first end connected to the control stick (2) via an integral first piece (401) having a cylindrical form, the connecting piece (4) having an integral second piece (402) extending eccentrically from the first piece (401) in an inclined manner, the second piece (402) having a first aperture (403) at a first end and a second aperture (404) at a second end;
    a connection point (5) which is a center of rotation for the control stick (2), the connection point (5) coupled to the bracket (3) via a connecting rod (501) extending outward from the bracket (3), the connecting rod (501) that limits movement of the connecting piece (4) and allowing the connecting piece (4) to be removably attached to the bracket (3) via a connecting pin (7) inserted through the first aperture (403) and the connection point;

a channel (6) located on the bracket (3) such that a non-zero distance is provided between the channel (6) and the connection point (5), wherein the channel (6) allows the control stick (2) to rotate to be brought to the first position (I) or the second position (II); and wherein the control stick (2) is moved by sliding a second end of the connecting piece (4) coupled to the channel (6) within the channel (6) via a mechanism having a first spring pin hole (601) located in a recess of the channel and an associated spring pin (9), so that the control stick (2) is brought into the first position (I) or the second position (II).

2. The control mechanism (1) according to claim 1, further comprising a handle (8) which extends outward from the connecting piece (4) via the second aperture (404) and allows the connecting piece (4) to slide on the channel (6).

3. The control mechanism (1) according to claim 1, further comprising a second spring pin hole (601) located on the channel (6), which allow the connecting piece (4) to be fixed on the first position (I) or the second position (II).

4. The control mechanism (1) according to claim 1, wherein the connecting piece (4) is V-shaped.

5. The control mechanism (1) according to claim 1, further comprising a floor (Z) on which the console (C) is located; and wherein in the first position (I) the control stick (2) extends upward from the console (C) relative to the floor (Z); and wherein in the second position (II) the control stick (2) extends downward from the console (C) relative to the floor (Z).

6. The control mechanism (1) according to claim 1, further comprising a rail mechanism (10) on which the bracket (3) is attached, which is located on the console (C) in a removable manner and allows the bracket (3) to move by sliding; wherein the control stick (2) has a third position (III) in which the control stick (2) is fixed on the rail mechanism (10) closer to the user; and wherein the control stick (2) has a fourth position (IV) in which the control stick (2) moves away from the user by sliding the bracket (3) from the third position (III).

7. The control mechanism (1) according to claim 1, further comprising control unit (K) to which data is transferred via cables extending from the first piece (401) for the mission input provided to the control stick (2) by the user.

8. The control mechanism (1) according to claim 1, wherein the control stick (2) is used for the console (C) provided on a helicopter.

9. The control mechanism (1) according to claim 1, wherein the bracket (3) is attached to the console (C) after the air vehicle is produced, wherein the bracket (3) allows the control stick (2), which is used for external mission input that consists of different mission equipment, to be attached on the console (C).

* * * * *